United States Patent [19]
Haskell et al.

[11] 3,885,079
[45] May 20, 1975

[54] PHOSPHATE COATED POLYMERIC SHAPED OBJECTS

[75] Inventors: Vernon C. Haskell; James L. Hecht, both of Richmond, Va.

[73] Assignee: E. I. du Pont de Nemours and Company, Wilmington, Del.

[22] Filed: Mar. 28, 1974

[21] Appl. No.: 455,805

Related U.S. Application Data

[60] Division of Ser. No. 273,301, July 19, 1972, Pat. No. 3,821,014, which is a continuation-in-part of Ser. No. 182,641, Sept. 22, 1971, abandoned.

[52] U.S. Cl. .................. 428/346; 428/522; 428/532
[51] Int. Cl. ...................... C01b 25/36; B32b 23/04
[58] Field of Search ............. 117/169 R, 76 F, 144; 161/191

[56] References Cited
UNITED STATES PATENTS

| 2,786,787 | 3/1957 | Florio | 117/169 R |
| 3,442,686 | 5/1969 | Jones | 117/72 X |
| 3,702,774 | 11/1972 | Birchall et al. | 117/121 X |
| 3,839,078 | 10/1974 | Birchall et al. | 117/169 R |

Primary Examiner—Ralph Husack

[57] ABSTRACT

Organic polymeric shaped objects, such as films, coated with aluminum and/or ferric orthophosphate of a specific atom ratio, and a process for their preparation using colloids or solutions of the coating material.

6 Claims, 6 Drawing Figures

SEALABLE TOPCOAT
METAL ORTHOPHOSPHATE
BASE FILM

3,885,079

PHOSPHATE COATED POLYMERIC SHAPED OBJECTS

This is a division, of application Ser. No. 273,301, filed July 19, 1972, now U.S. Pat. No. 3,821,014 and which is a continuation-in-part of copending application Ser. No. 182,641, filed Sept. 22, 1971, now abandoned.

BACKGROUND OF THE INVENTION

In the preparation of thermoplastic polymeric films and the like, it is often necessary to modify the permeability or surface characteristics of the finished product to impart characteristics not exhibited by the film itself. Accordingly, many different classes of coating materials have previously been used to modify the characteristics of thermoplastic materials. Of the inorganic materials used for coating continuous, glassy coatings are known to provide excellent moisture and gas barrier properties. However, such materials are generally difficult to apply to the polymer surface, and particularly good barrier materials are continually sought for coatings.

SUMMARY OF THE INVENTION

The present invention provides coated structures having remarkably improved moisture and gas impermeability which are easily and economically prepared.

Specifically, the instant invention provides an organic, polymeric shaped article having a substantially continuous, gas impermeable coating on at least one surface thereof, the coating comprising metal orthophosphate wherein the atom ratio of metal to phosphorus is about from 2.3 to 0.5, and wherein at least 50 percent of the metal is selected from aluminum and iron, up to about 50 percent of the metal is selected from tin, titanium, and zirconium, and up to about 20 percent of the metal is selected from zinc, chromium and magnesium.

Preferably, coated films of the invention further comprise a sealable polymeric coating applied over the phosphate coating.

The coated shaped articles can be prepared by applying to an organic, polymeric shaped article a dispersion comprising metal ions and orthophosphate ions wherein the atom ratio of metal to phosphorus is about from 2.30 to 0.5, and drying the coated film at elevated temperatures to remove excess solvent.

DETAILED DESCRIPTION OF THE INVENTION

Figures 1, 2:
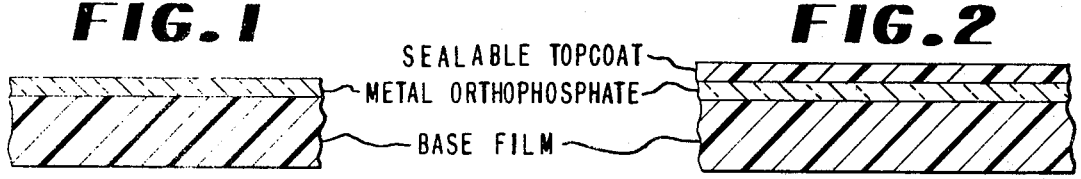
FIGS. 1 and 2 are cross-sectional illustrations of representative coated films of the instant invention, the layers of the films not being drawn to scale.

Shaped articles which can be used in the instant invention include films, containers, bottles, fibers and the like prepared from polyesters, polyalkyls such as polypropylene and polyethylene and copolymers thereof including ionomers, the perfluoro polymer prepared from tetrafluoroethylene and hexafluoropropylene, polyacrylonitrile, polyvinyl chloride, polyvinylidene chloride, polyvinyl fluoride, polystyrene, polyimides, polyamides, cellulose acetate, cellophane and the like. Of these, polyester films such as oriented heat set polyethylene terephthalate and oriented linear polypropylene films are particularly preferred.

The coatings of the instant invention comprise either aluminum or iron orthophosphate or combinations thereof. It has been found that these compositions provide excellent barrier properties for thermoplastic films when the atom ratios of the metal to phosphorus are about from 2.3 to 0.5. These excellent barrier properties are also obtained when at least 50 percent of the metal is aluminum or iron, the remainder being a compatible metal orthophosphate. For example, up to fifty percent of the metal can be selected from tin, titanium, and zirconium. Up to about twenty percent of the metal can comprise zinc, chromium or magnesium, without depreciation of the barrier properties, if the remainder of the metal is aluminum or iron.

When the metal orthophosphate consists essentially of aluminum orthophosphate, an atom ratio of about from 1.3 to 0.8 has been found to give particularly good barrier properties. In the case of ferric orthophosphate, atom ratios of 1.2 to 0.6, and particularly 0.65 to 0.95, have been found to give especially good barrier properties.

The coatings of the present invention are in a substantially glassy, or noncrystalline state. The presence of minor percentages of isolated crystals, however, will not depreciate the moisture and gas barrier properties of the coatings.

The metal orthophosphate can be applied to the polymeric substrate in the form of a colloidal dispersion or solution. The medium can be water or an organic solvent such as methanol, acetonitrile or dimethylformamide. Aqueous solutions have been found particularly convenient for most applications, but methanol can be used in a dispersion to replace all or part of the water. Ethanol can be used as the medium by itself when additives such as melamine formaldehyde resin are not used. Organic solvents are beneficial for use in coating normally water-sensitive substrates such as cellophane. Organic solvents should be selected, of course, so that the orthophosphate coating elements are either soluble or dispersable in the solvent. As will be similarly evident to those skilled in the art, polar solvents, preferably having a high dielectric constant, should be used in view of the ionic character of the inorganic salts used to formulate the present coatings.

The dispersion can be prepared by first dissolving in the desired medium any composition that will, in solution, yield the desired ions. Representative sources of aluminum ion include aluminum chlorhydroxide, aluminum chloride ($AlCl_3 \cdot 6H_2O$), basic aluminum acetate, or aluminum orthophosphate such as that commercially available from the Monsanto Company as "Alkophos." Similar sources of ferric ion can be used, such as ferric chloride ($FeCl_3 \cdot 6H_2O$). Sources of phosphate ion that can be used, in addition to the aluminum orthophosphate indicated above, include phosphoric acid. The aluminum or iron and phosphate sources should be added in quantities that will result in atom ratios of aluminum or iron to phosphorus within the required limits. Metals other than aluminum or iron can be added, for example, as halides of the metal.

In the substitution of metals for the aluminum or iron in the present coatings, differing procedures should be used in the preparation of the coating compositions. For example, when tin is used in conjunction with aluminum, a coating composition can be prepared using 86 percent phosphoric acid, 50 percent aluminum chlorhydroxide solution and $SnCl_4 \cdot 5H_2O$. The coating composition can be prepared by first dissolving the phosphoric acid in water, followed by the addition of the aluminum chlorhydroxide. The $SnCl_4 \cdot 5H_2O$ can then be added with stirring, after which "Rexyn 201" or a similar ion exchange resin is added to remove chloride. The order of addition in this formulation is important, since the addition of the tin compound directly to the phosphoric acid would result in precipitation, while the indicated order of addition ties up the phosphoric acid to avoid precipitation.

A substantially similar order of addition can be used when titanium comprises part of the coating formulation. Using titanium tetrachloride in the preparation of the coating solution or dispersion, it is helpful to predissolve the titanium tetrachloride, for example, as a 10 percent solution, in ice water to dissipate the heat of reaction with water. It has also been found beneficial to stabilize the colloid with up to about 25 percent chloride ion. Similar procedures are helpful when incorporating zirconium into the coating formulation, using a 20 percent aqueous solution of basic zirconyl chloride. Magnesium, chromium and zinc can be incorporated as the chlorides of these metals using the same general procedures as outlined for the addition of tin.

The concentration of the dispersion is not critical to the invention and can be adjusted to satisfy the requirements of coating apparatus used and final coating thickness desired. In general, the dispersions have a solids content of less than about 6 percent, when used with kiss or doctor roll coating techniques.

The coating dispersions are applied in such quantities to give a final coating weight of about from 0.1 to 0.6 g/m², to give the desired barrier properties.

In the event that sources of metal are used that result in the formation of HCl or chloride ions, the removal of the HCl so formed is necessary to insure the good barrier properties of the invention, and to achieve wettability of the dispersion onto the polymer surface. It has been found that when $AlCl_3$ or $FeCl_3$ are used as the source of aluminum or iron, the removal of about 90 percent of the chloride ion is necessary. This removal can be effected, for example, by dialysis or by means of an ion exchange resin such as "Rexyn 201" commercially available from Fisher Scientific Co. By contrast, chloride removal is not generally necessary when aluminum chlorhydroxide, basic aluminum acetate or "Alkophos" are used to prepare the coating colloid. In general, it is desirable to remove as much chloride ion as possible without causing the colloidal sol to gel prematurely.

The dispersion can also contain additives such as resins that improve the wettability and adhesion of the coatings to the base to which they are applied. Additives which have been found particularly effective in this application include melamine-formaldehyde resins, urea-formaldehyde resins, polyethylenimine, and amino acids such as glycine and alanine alone or in combination. Particular resins that can be used include "Accobond 3524" trimethylolmelamine modified with iminobispropylamine, "Cymel 300" hexamethoxymethylmelamine, and "Cymel 450" melamine formaldehyde resin. Of these, "Accobond 3524" is particularly preferred because of its wetting characteristics coupled with its protection of coating barrier properties upon heating. In general, up to about 50 percent, by weight of the phosphate, of such additives can be used in the coating. The additive is conveniently incorporated into the dispersion after the addition of the phosphate-containing compound and before the addition of the iron or aluminum ions.

The dispersion can be coated onto one or both sides of the substrate using any conventional coating technique including, for example, kiss coating, doctor rolls, gravure rolls, immersion coating techniques, spraying, and the like, with or without such expedients as Mayer rods or air doctor knives. The dispersion is preferably applied to the polymeric substrate within a relatively short period after preparation, since extended aging of the dispersion, e.g., longer than 24 hours, permits slight gelation of the coating material. The coating thickness should be such as to give at least 0.02 g./m.² of the phosphate on the coated surface, and preferably about from 0.1 to 0.6 g./m.². The dispersion can be applied, for better adhesion, to a substrate that has been pretreated.

Treatments which can be used include flame treatment, electrical discharge treatment, as well as acid or alkaline etching of the substreate surface. In general, pretreatment by conventional flame or electrical discharge treatment is preferred. However, when a resin additive is used in the dispersion, the need for treatment of the base surface is frequently eliminated.

After application of the dispersion, the coated substrate is dried at elevated temperatures to remove excess water from the dispersion. Drying times and temperatures will vary widely, depending, for example, on the composition of the base polymeric article, the chemical composition of the coating, the concentration of the coating sol, the coating thickness, and the air flow in the drier. Coated films are conveniently dried by passing through a tower with radiant heat and countercurrent air flow. When organic solvents are used for application of the coatings, substantially all of the solvent should be removed, including the solvated residues that have become chemically attached to the inorganic oxides. The formation of a good barrier may in some cases be facilitated by the incorporation of small amounts of water, to assist in the removal of bulkier organic residues.

The coatings applied from aqueous systems should be dried to the normal water content of the coating, generally less than about 80 percent by weight of the coating. In general, the amount of water necessary in the coating will decrease with increasing quantities of adhesion-promoting additive, such as a melamine-formaldehyde resin, present in the coating. Excessive residual water or incomplete drying can cause discontinuities in the coating. Similarly, drying at an exceptionally fast rate will disrupt the coating structure to give poor barrier properties.

After completion of the drying of the phosphate coating, the coated film can be further treated by priming and applying a sealable topcoat of a polymeric material such as polyethylene, vinylidene chloride polymers and copolymers, and ethylene vinyl acetate. Priming agents that can be used include silanes, polyurethanes, aqueous solutions of melamine formaldehyde resins, and aluminum chlorhydroxide. The top coating can be applied by solvent coating, conventional melt extrusion techniques, hot lamination of a performed film of the heat sealable polymer, or polymer dispersions. It has been found that the barrier properties of films of the invention are often markedly improved when sealable polymer topcoats are applied. The improvement so realized is generally substantially greater than the expected additive effect of the barrier properties of the two coatings.

The application of a sealable topcoat to the inorganic coatings of the present invention is particularly preferred for several reasons. In addition to imparting sealability to the surface, the topcoat improves the impact and abrasion resistance of the coated films of the present invention. In addition, the extent to which the coated films can be elongated without depreciating the barrier properties is increased. Most significantly, however, is the further improvement in barrier properties that the sealable topcoat provides. While the mechanism for this improvement is not fully understood, it is postulated that the sealable topcoat seals minute pores or fissures that are present in the inorganic barrier layer. In general, it is recognized that the total permeability ($P_t$) of a composite varies with the permeability of the individual components ($P_1$, $P_2$, etc.) by the following relationship:

$$1/P_t = 1/P_1 + 1/P_2$$

It has been found that the improvement realized through the application of a sealable topcoat in accordance with the instant invention decreases gas and water vapor permeability to an extent greater than would be expected from this standard relationship.

After drying of the metal phosphate coating, the composition of the coating can be verified using an X-ray emission spectrometer equipped with chromium and tungsten target X-ray tubes, and sample holders permitting irradiation of flat film specimens. In the use of this equipment, any topcoat is first removed from the inorganic coating by immersing the film specimen in tetrahydrofuran or hot toluene, depending on the topcoat involved. The sample is then rinsed until free of polymer and dried in an oven for 10 minutes at 120°C. The film specimen is then irradiated in an X-ray spectrometer equipped with a chromium target tube and pentaerythritol crystal and scan angles. Peaks of intensity of secondary X-rays for aluminum phosphate will be observed at 89.40° for phosphorus and 144.67° for aluminum. A similar procedure can be used to identify ferric phosphate, using a tungsten target tube to identify and measure iron.

For measurement of the aluminum to phosphorus ratio, standard film samples shsuld be prepared having known amounts of aluminum and phosphorus expressed in grams per unit area. The base film from the same lot as that used to make the standards should be available for a blank measurement of secondary radiation. Factors for both aluminum and phosphorus should be separately calculated by measuring the counts per unit time at 89.40° and at 144.67° for the known sample and subtracting the counts at the same setting for the blank and dividing grams per unit area of aluminum by the net counts. The counts per unit time from the test sample at 89.40° and 144.67° should then be measured and the counts from the blank subtracted, after which the result should be multiplied by the factor for aluminum. The procedure is then repeated for phosphorus and the atom ratio of aluminum to phosphorus is obtained by dividing the grams per unit area by the atomic weight and establishing the ratio.

Figure 3:
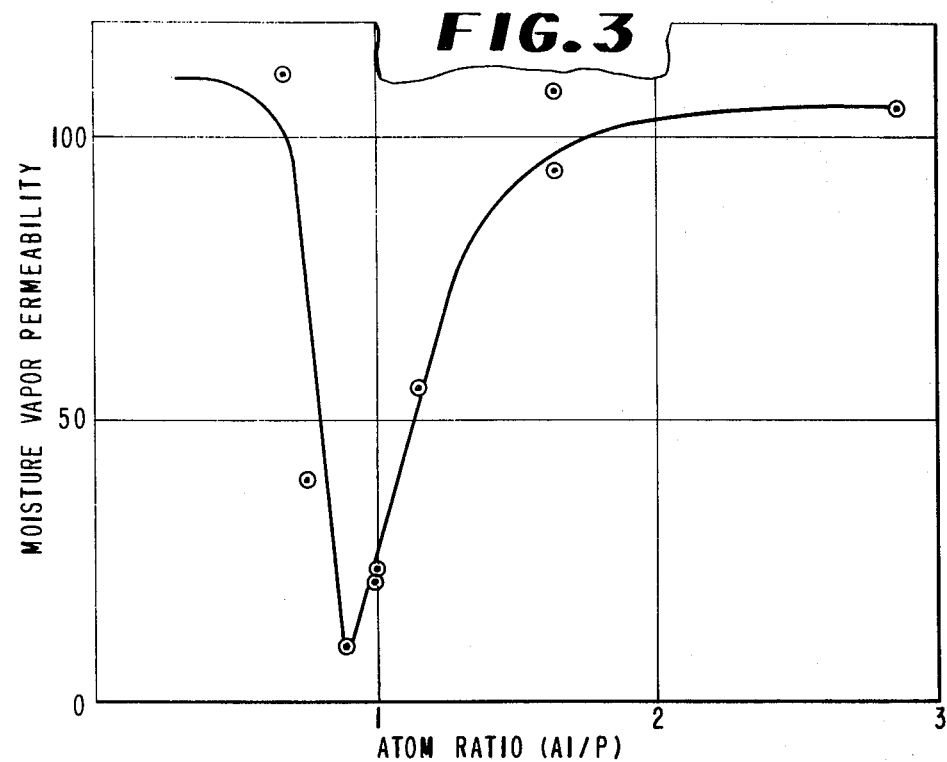
FIGS. 3 and 4 are graphical representations of the effect of aluminum and ferric orthophosphate compositions, respectively, on moisture barrier properties.
Figure 6:
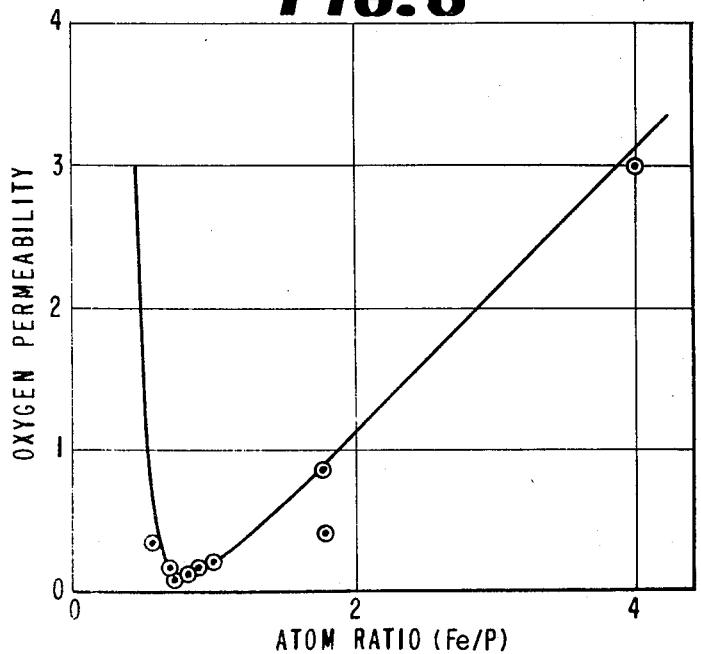
FIGS. 5 and 6 are graphical representations of the effect of aluminum and ferric orthophosphate compositions, respectively, on oxygen barrier properties.
Figure 4:
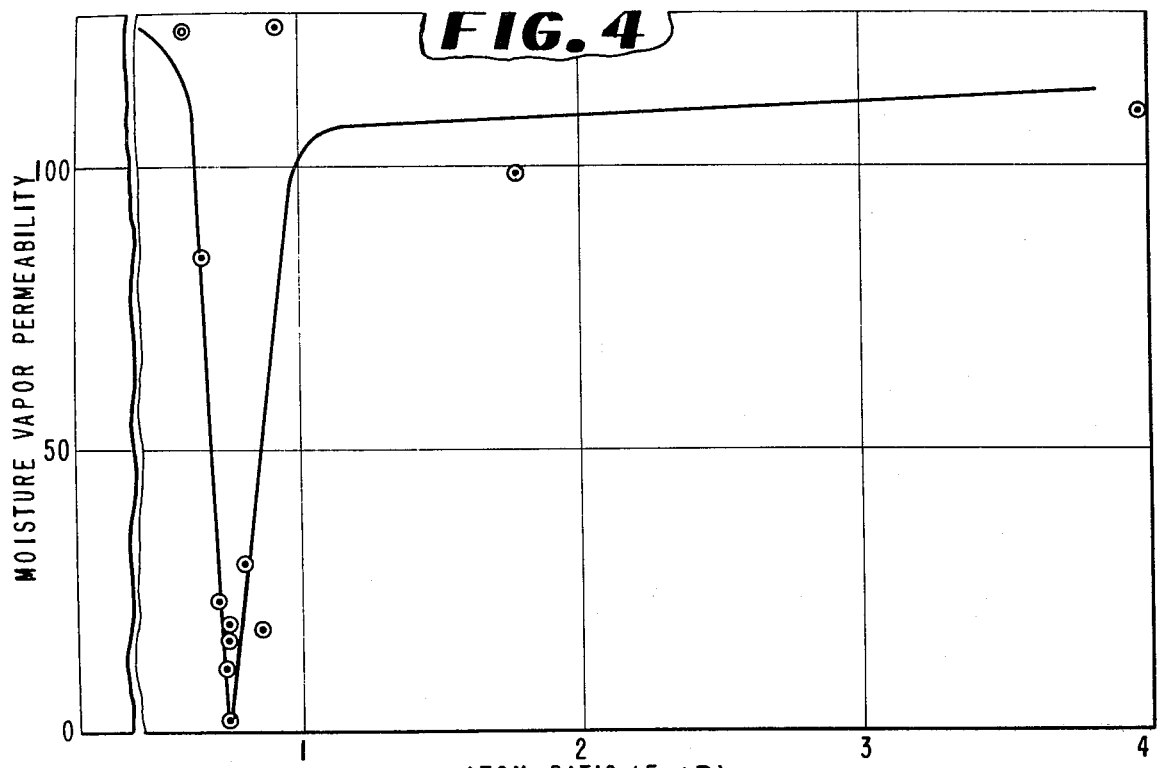
Figure 5:
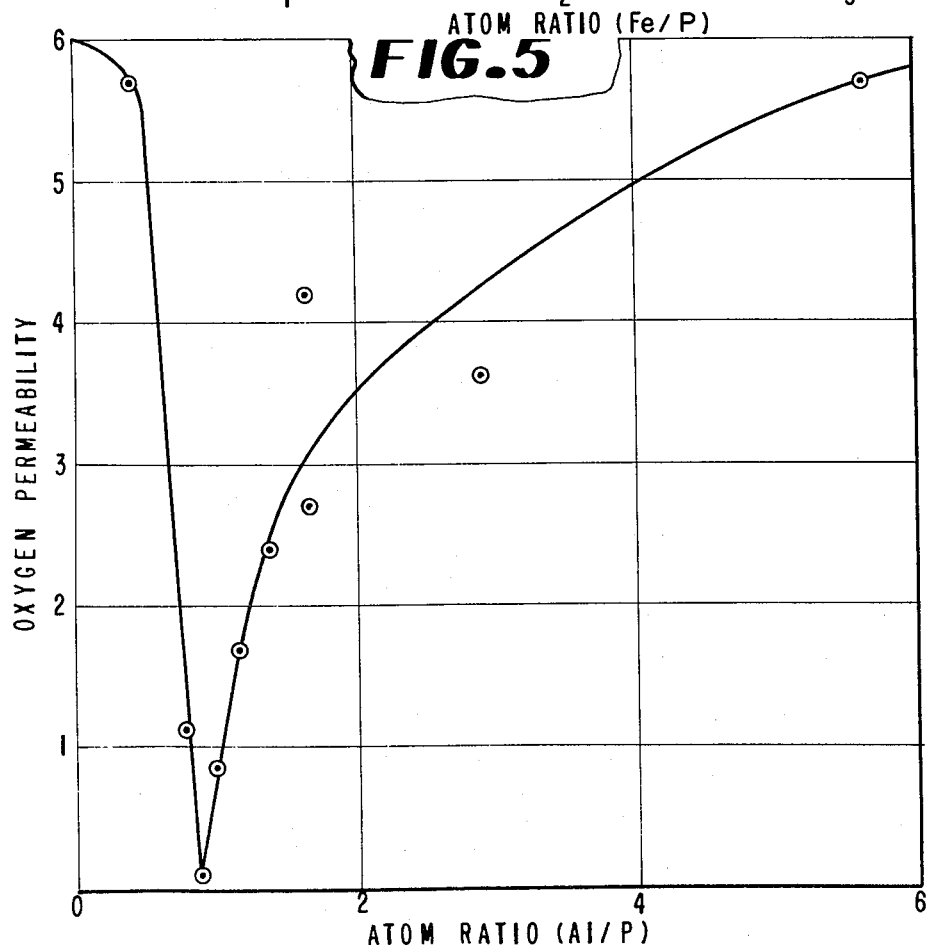

The coatings of the present invention markedly improve the barrier properties of the base films to which they are applied. FIGS. 3–6 illustrate these improvements, and represent aluminum or ferric orthophosphate coatings applied in thicknesses of about from 0.1–0.4 g./m.$^2$ to a 1-mil, biaxially oriented polyethylene terephthalate film, flame treated to promote adhesion. The coating samples on which the graphs are based consist essentially of the aluminum or ferric orthophosphate, without adhesion promoting additive, and without a sealable topcoat.

As can be seen from these figures, coatings of the present invention provide markedly improved oxygen barriers within the required composition limits, and markedly good water vapor barrier properties within the preferred compositions.

The invention is further illustrated by the following examples. The oxygen permeability characteristics in Examples 1–5 are measured on a cell connected to a mass spectrograph using helium transmission. The helium transmission was calibrated against oxygen transmission in a volumetric cell according to ASTM D-1434-58. The oxygen permeability in Examples 6–10 are measured using an "Ox-tran 100" apparatus commercially available from Modern Controls, Inc. The moisture permeability is measured automatically by a Honeywell Model W825 water vapor transmission tester.

EXAMPLE 1

A colloidal dispersion was prepared from 845 grams of 50 percent aluminum chlorhydroxide solution, commercially available as "Chlorhydrol" from Reheis Division, Armour & Co.; 500 grams of 86 percent phosphoric acid, 28.6 lbs. of water, and 190 grams of "Accobond 3524" melamine formaldehyde resin. The dispersion was prepared by first combining the phosphoric acid and one half of the water, adding the melamine formaldehyde resin, and combining this with a mixture of the aluminum chlorhydroxide and the other half of the water. The dispersion, having an aluminum/phosphorus ratio of 0.9, was coated onto both sides of a 0.5 mil biaxially oriented, heat set polyethylene terephthalate film using doctor rolls.

The coated film was dried in a radiant-heated tower with a countercurrent air flow of 10 cfm./ft.$^2$ of film. The film was dried first in air at about 115°C. for 4 seconds and then in air at about 170°C. for 8 seconds. The final coating thickness was about 0.18 gram per square meter, or about 0.004 mil.

The coated film exhibited a moisture permeability of 20.0 g./100 m.$^2$/hr. and an oxygen permeability of 0.1 cc./100 in.$^2$/24 hrs./atm. To establish a control standard, if a sample of biaxially oriented heat set 0.5 mil polyethylene terephthalate film is coated according to standard commercially used techniques, with a vinylidene chloride copolymer at a thickness of 3.8 g./m.$^2$, this type of film will typically exhibit a moisture permeability of 50.0 and an oxygen permeability of 1.5. Completely uncoated film of this type typically exhibits a moisture permeability in excess of 225 g./100 m.$^2$/hr. and an oxygen permeability of 10 cc./100 in.$^2$/24 hrs./atm.

EXAMPLE 2

A colloidal dispersion was prepared by combining 5.7 grams of $FeCl_3 \cdot 6H_2O$, 2.8 grams of 86 percent phosphoric acid, 1.5 grams of "Accobond" melamine formaldehyde resin and 90 grams of water. The aqueous dispersion was then treated to remove excess HCl by stirring it with 32 grams of "Rexyn 201" ion exchange resin, having an exchange capacity of 4.4 meg./g. dry resin and 61 percent moisture, and then removing the exchange resin.

The dispersion, having an iron/phosphorus ratio of 0.74, was coated onto one side of a biaxially oriented, heat set one mil polyethylene terephthalate film with a kiss coater and dried with radiant heat to give a coating thickness of 0.19 g./m.$^2$.

The coated film was tested for moisture and gas permeability and was found to have a moisture permeability of 29.3 g./100 m.$^2$hr. and an oxygen transmission rate of 0.042 cc./ 100 in.$^2$/24 hrs./atm.

EXAMPLE 3

If the procedure of Example 1 is repeated, with the modifications set forth below, the following results will be obtained:

A colloidal dispersion is prepared substantially as in Example 1, except the melamine formaldehyde resin is omitted and the base film is flame treated. The dispersion is applied to give a final coating thickness of 0.2 gram per square meter and is dried for 4 seconds at 115°C. and 8 seconds at 90°C.

The coated film is found to have a moisture permeability of 15 g./100 m.$^2$/hr. and an oxygen permeability of 0.07 cc./100 in.$^2$/24 hrs./atm.

If the film is further coated with vinylidene chloride copolymer containing 92 percent vinylidene chloride, using conventional priming and coating techniques, so as to give a vinylidene chloride coating of about 3.3 grams per square meter, the moisture permeability is reduced to 11.9 and the oxygen permeability is reduced to 0.024.

EXAMPLE 4

If the procedure of Example 2 is repeated, except for the modifications indicated, the following results will be obtained:

A dispersion is prepared as in Example 2, except that the melamine formaldehyde resin is omitted. The coating is applied to flame treated polyethylene terephthalate base film to give a final coating thickness of 0.26 gram per square meter and dried under the same conditions as in Example 2. The final coated film exhibits a moisture permeability of 5.1 and an oxygen permeability of 0.05.

If the above film is further coated with vinylidene chloride copolymer, containing 92 percent vinylidene chloride, at a thickness of 2.5 grams per square meter, the moisture permeability is found to be substantially unchanged and the oxygen permeability is 0.018.

EXAMPLE 5-7

If the dispersion of Example 1 is coated onto base films of polypropylene, polyvinylidene chloride-coated cellophane, and polyamide, similar improvements in moisture and/or oxygen barrier properties will be obtained.

EXAMPLE 8

The general procedure of Example 1 was repeated, using methanol as the solvent for the aluminum orthophosphate coating instead of water. The fomulation of the aluminum orthophosphate coating bath was 90.7 grams of 50 percent aluminum chlorhydroxide, 54.0 grams of phosphoric acid, 20.0 grams of 30 percent melamine formaldehyde resin, and 1,169 milliliters of methanol.

The aluminum orthophosphate coated film was then coated with a topcoating of 240 grams of copolymer of about 93.5 percent vinylidene chloride, 3 percent acrylonitrile, 3 percent methyl methylacrylate and 0.5 percent itaconic acid; 60 grams of Shell Epon 1001 resin; 6 grams of paraffin wax; 2 grams of water ground talc; 600 milliliters of toluene; and 1,100 milliliters of tetrahydrofuran. This topcoating was applied in the same manner similar to the aluminum orthophosphate.

The film samples were tested for moisture and gas permeability, and the results obtained were as follows:

|  | $AlPO_4$ only | $AlPO_4$ + Topcoat |  |
| --- | --- | --- | --- |
| Coating weight (g./m.$^2$) | 0.34 | 4.3 | (topcoat) |
| Moisture Permeability (g./100 m.$^2$/hr.) | 50 | 4.2 |  |
| Oxygen Permeability (cc./100 in.$^2$/24 hr.) | 0.20 | 0.02 |  |

EXAMPLE 9

The general procedure of Example 8 was repeated, except that 1,189 milliliters of ethanol is used in place of the methanol and melamine formaldehyde resin, and the substrate coated was cellophane instead of biaxially oriented polyethylene terephthalate.

The film samples coated with aluminum orthophosphate as well as aluminum orthophosphate and the polymer topcoat were tested for moisture and gas permeability, and were found to exhibit the following characteristics:

|  | $AlPO_4$ only | $AlPO_4$ + Topcoat |  |
| --- | --- | --- | --- |
| Coating weight (g./m.$^2$) | 0.53 | 3.8 | (topcoat) |
| Moisture Permeability (g./100 m.$^2$/hr.) | 620 | 13.3 |  |
| Oxygen Permeability (cc./100 in.$^2$/24 hr.) | 0.07 | 0.02 |  |

Uncoated cellophane generally has a moisture permeability of several thousand and an oxygen permeability, for normal moisture content, of about from 1–5.

EXAMPLE 10

The procedure of Example 8 is repeated, except that 1,169 milliliters of water are substituted for the methanol in the aluminum phosphate dispersion, and 2 grams of 86 percent phosphoric acid is added to the topcoating formulation.

The resulting film samples, having aluminum orthophosphate as well as aluminum orthophosphate with a polymer topcoat, are evaluated for moisture and oxygen permeability and found to exhibit the following characteristics:

|  | AlPO$_4$ | AlPO$_4$ + Topcoat |  |
|---|---|---|---|
| Coating weight (g./m.$^2$) | 0.33 | 1.9 | (topcoat) |
| Moisture Permeability (g./100 m.$^2$/hr.) | 18 | 8.7 | |
| Oxygen Permeability cc./100 in.$^2$/24 hr.) | 0.30 | 0.09 | |

We claim:

1. A cellophane film having a substantially continuous, gas-impermeable coating on at least one surface thereof, the coating comprising aluminum orthophosphate wherein the atom ratio of aluminum to phosphorus is about from 2.3 to 0.5.

2. A film of claim 1 wherein the atom ratio of aluminum to phosphorus is about from 1.3 to 0.8.

3. A film of claim 1 further comprising a sealable topcoat on at least one coated surface of the film.

4. A film as defined in claim 3 wherein said sealable topcoat is a vinylidene chloride copolymer topcoat.

5. A film as defined in claim 1 wherein said aluminum orthophosphate is applied from an organic solvent.

6. A film as defined in claim 5 wherein said organic solvent is ethanol.

* * * * *